(No Model.) 2 Sheets—Sheet 1.

C. S. COOK.
CONTROLLER FOR ELECTRIC MOTORS.

No. 597,265. Patented Jan. 11, 1898.

Witnesses
Inventor
Charles S. Cook
By his Attorney (No Model.) 2 Sheets—Sheet 2.

C. S. COOK.
CONTROLLER FOR ELECTRIC MOTORS.

No. 597,265. Patented Jan. 11, 1898.

WITNESSES:
Ethan D. Dodds
Hubert C. Tener

INVENTOR
Charles S. Cook
BY
Wesley G. Carr
ATTORNEY.

THE NORRIS PETERS CO., PHOTO-LITHO., WASHINGTON, D. C.

UNITED STATES PATENT OFFICE.

CHARLES S. COOK, OF PITTSBURG, PENNSYLVANIA, ASSIGNOR TO THE WESTINGHOUSE ELECTRIC AND MANUFACTURING COMPANY, OF SAME PLACE.

CONTROLLER FOR ELECTRIC MOTORS.

SPECIFICATION forming part of Letters Patent No. 597,265, dated January 11, 1898.

Application filed January 2, 1897. Serial No. 617,735. (No model.)

*To all whom it may concern:*

Be it known that I, CHARLES S. COOK, a citizen of the United States, residing in Pittsburg, in the county of Allegheny and State of Pennsylvania, have invented a new and useful Improvement in Controllers for Electric Motors, (Case No. 723,) of which the following is a specification.

My invention relates to devices for controlling the operation of electric motors, and more particularly to controlling devices for motors employed for operating elevators and hoists.

The object of my invention is to provide a controller which shall be simple and inexpensive in construction and efficient in operation and which shall serve to start, stop, and reverse the motor without danger of injury to the shunt-winding of the motor field-magnet.

Figure 1:
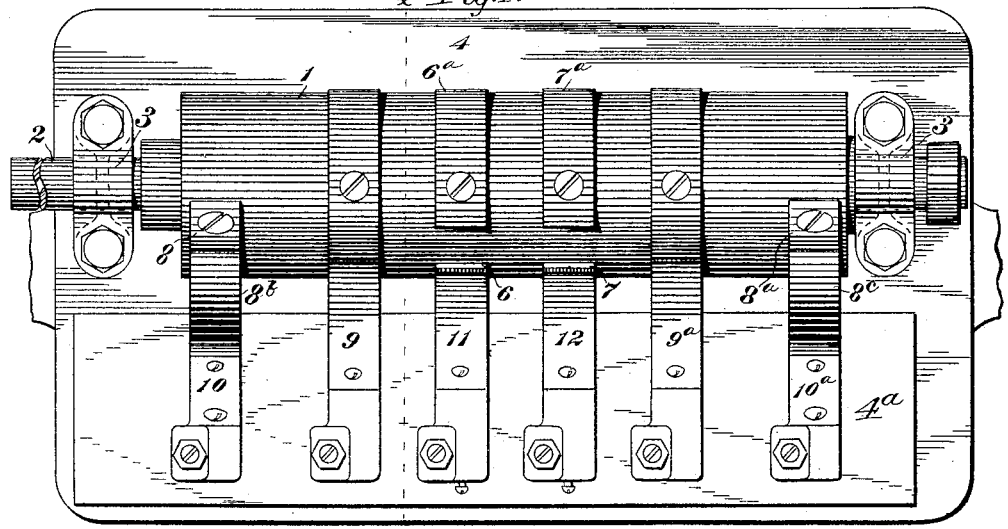
Figure 2:
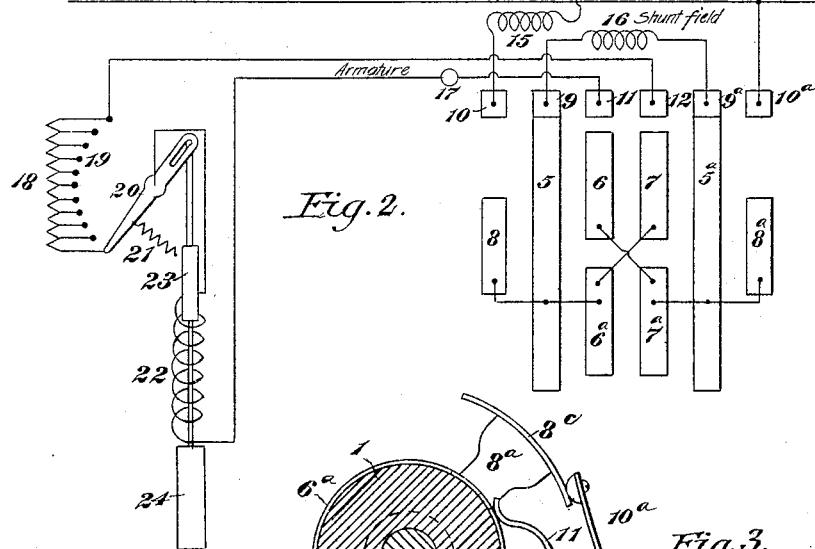
Figure 3:
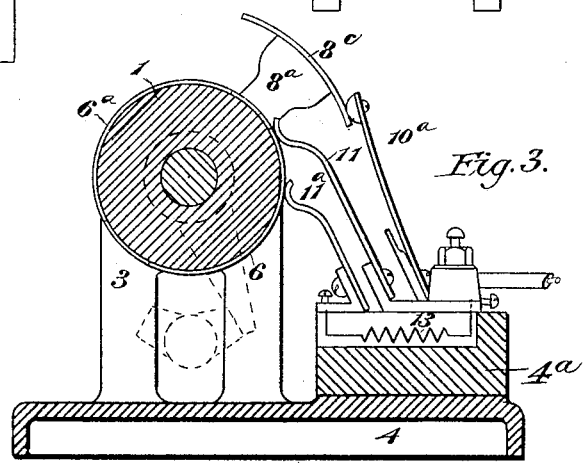
Figure 4:
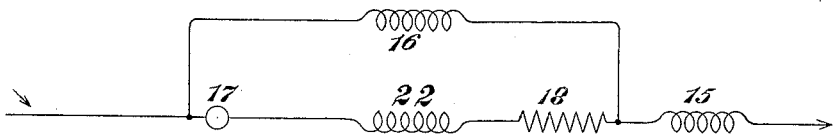
Figure 5:
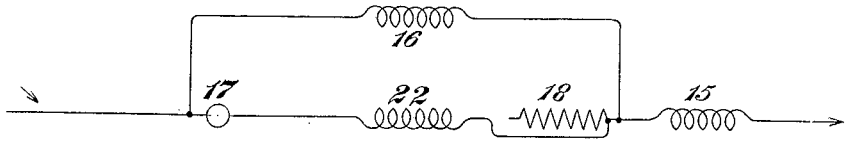
Figure 6:
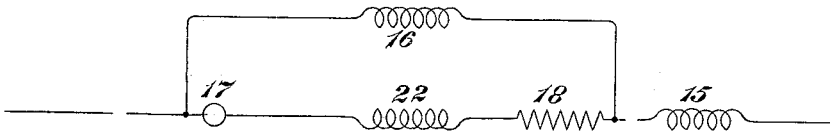
Figure 7:
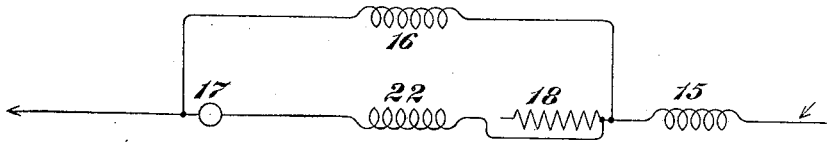

In the accompanying drawings, Figure 1 is a plan view of the starting, stopping, and reversing switch. Fig. 2 is a diagram of the controller-circuits, and Fig. 3 is a vertical transverse section on line $x\ x$ of Fig. 1. Fig. 4 is a diagram of circuits when the switch assumes the position shown in Figs. 1 and 3. Fig. 5 is a similar view for the same position of the switch after the starting-resistance has been cut out. Fig. 6 is a diagram of the circuits when the switch is in open-circuit position, and Fig. 7 is a diagram corresponding to Fig. 5 when the switch is reversed.

The switch-drum 1 is rigidly mounted upon a shaft 2, which in practice will be provided with a suitable sprocket wheel or pulley (not shown) to be operated by means of a chain or rope extending through the elevator-car, as is usual in apparatus of this character. Bearings 3 for the shaft 2 are mounted upon a suitable base 4, and the latter is provided with an insulating support $4^a$ for the stationary contacts of the switch, to be hereinafter described. The body of the drum 1 is preferably of insulating material, and is provided with two metal contact-strips 5 and $5^a$, which may extend completely around it, as shown. Between the strips 5 and $5^a$ are two pairs of metal contact-strips 6 $6^a$ and 7 $7^a$, each pair being in circumferential alinement and separated from each other by spaces of suitable width.

At or near the ends of the drum 1 are arms 8 and $8^a$, respectively provided with contact-plates $8^b$ and $8^c$. Stationary contacts 9 and $9^a$ bear respectively against the strips 5 and $5^a$, and stationary contacts 10 and $10^a$ coöperate with the plates $8^b$ and $8^c$ on the arms 8 and $8^a$. Two contact-brushes 11 and $11^a$ are provided for the strips 6 and $6^a$, and two similar brushes 12 and $12^a$ are provided for the strips 7 and $7^a$. The contact ends of each pair of brushes 11 $11^a$ and 12 $12^a$ are separated sufficiently to bridge the space between the corresponding pairs of contact-strips 6 $6^a$ and 7 $7^a$. Each pair of brushes is connected by a resistance 13, the purpose of which will be hereinafter stated.

Referring now more particularly to Fig. 2, 14 is the circuit from which current is supplied to the motor. 15 is the series field-magnet winding, 16 the shunt field-magnet winding, and 17 the armature of the motor.

18 is a variable resistance having a series of contact-points 19, with which one end of the pivoted contact-arm 20 engages.

21 is a spring for normally holding the arm 20 in the position shown in the drawings.

22 is a solenoid connected in series with the motor-armature 17 and the resistance 18, and 23 is the solenoid-core, which is connected with one end of the switch-arm 20 and with a dash-pot 24.

The operation of the invention is as follows: When the shaft 2 is rotated so as to move the drum from the position indicated in Fig. 2 to that indicated in Figs. 1 and 3, the current will pass into the switch by contacts $10^a$ and $8^a$ through contacts $5^a$, $7^a$, 6, 11, and $11^a$, armature 17, solenoid 22, arm 20, and resistance 18, contacts 12 and $12^a$, 7, $6^a$, 8, and 10, and series field-magnet coil 15. When the current reaches contact-strip $5^a$, more or less of it will be shunted through the same, contact $9^a$, shunt field-magnet winding 16, and contacts 9 and 5, the amount obviously depending upon the resistance of the shunt-winding. For the circuits corresponding to the position of the switch above indicated see Fig. 4. The solenoid 22 will gradually draw down its core 23 against the action of spring 21 and dashpot 24, and thus move the arm 20 to progressively cut out the resistance 18. For the circuits when the resistance is all cut out see Fig. 5. When the motor is stopped by rotating the drum 1 sufficiently to separate the contacts 8 and 10 and $8^a$ and $10^a$, the solenoid 22 will release its core, and the spring 21 will act to move the contact-arm 20 over the contacts 19, and thus reinsert the resistance 18 in circuit. When the switch is in the open-circuit position just indicated, a closed circuit is still maintained which includes the shunt field-magnet winding and the armature-winding, as is indicated in Fig. 6. Such condition obtains by reason of the construction and arrangement of the contact-strips 5, $5^a$, 6, $6^a$, 7, and $7^a$ and the coöperating stationary contacts hereinbefore described. As the circuit which includes the armature-winding and the shunt field-magnet winding is maintained closed at all times and under all circumstances, substantially all danger of injury to the insulation of the shunt-winding is avoided. This is an important feature, since the opening of the shunt-circuits of compound and shunt wound motors by the switches heretofore employed has frequently been productive of material injuries to insulation. When it is desired to reverse the motor, the drum 1 is rotated from right to left, as viewed in Fig. 3, until the forward ends of the contact-strips $8^b$ and $8^c$ are respectively brought into engagement with the contact-fingers 10 and $10^a$ and the strips $6^a$ and $7^a$, respectively, into engagement with the brushes 11 and 12. In passing from the strip 6 to the strip $6^a$, and vice versa, one of the pair of brushes 11 $11^a$ remains in contact with the corresponding strip on the drum until the other brush of the pair has made contact with the other strip 6 or $6^a$, as the case may be. It will be readily seen that the relation above described also exists between the parts 7, $7^a$, 12, and $12^a$. When the described reversal has been effected, the solenoid 22 will draw its core 23 downward and thus move the arm 20 over the contacts 19 until the resistance 18 is cut out of circuit. The circuits will then be as is indicated in Fig. 7. The resistance 13 between the brushes 11 and $11^a$ and that between the brushes 12 and $12^a$ are provided in order to take the armature-discharge and thus prevent injury to the insulation of the shunt-winding in case the armature-circuit is reversed before the resistance 18 has been reinserted.

While I have shown my invention as employed in connection with a motor having a compound-wound field-magnet, it will be understood that the invention is equally well adapted to shunt-wound motors.

I desire it to be also understood that my invention is not limited as regards the details of construction shown and described.

I claim as my invention—

1. The combination with an electric motor having a shunt or compound wound field-magnet, of a starting, stopping and reversing switch therefor provided with means for reversing the direction of current flow in the armature-winding and maintaining a closed circuit which includes the armature and shunt windings in series with each other and constitutes the only path for current during the reversing operation.

2. The combination with an electric motor having a shunt or compound wound field-magnet, of a resistance and means for automatically cutting the same into and out of circuit and a stopping, starting and reversing switch provided with means for maintaining a closed circuit which includes the armature and shunt windings in series with each other and constitutes the only path for current during the reversing operation.

3. A controller for electric motors having a shunt or compound wound field-magnet comprising a starting, stopping and reversing switch having separable contacts for the main circuit-terminals and non-separable contacts for the terminals of the shunt field-magnet and armature windings.

4. A starting, stopping and reversing switch for electric-motor controllers having two-part brushes for each pair of movable reversing-contacts, said parts being connected by a resistance.

5. In a controller for electric motors having shunt or compound wound field-magnets, a starting, stopping and reversing switch comprising non-separable contacts for the shunt-winding terminals and non-separable contacts for the armature-circuit terminals the movable members of the latter being cross-connected and each of its stationary members comprising a pair of brushes spaced apart to bridge the space between the corresponding movable contacts and connected by a resistance.

6. The combination with an electric motor having a shunt or compound wound field-magnet, of a resistance and means for automatically cutting the same into and out of circuit and a switch provided with means for reversing the direction of current flow in the armature-winding and at the same time maintaining a permanently-closed circuit which includes the armature and shunt windings and constitutes the only path for current during the reversing operation.

7. The combination with an electric motor having a shunt or compound wound field-magnet, of a starting, stopping and reversing switch provided with means for permanently maintaining a closed circuit which includes the armature and shunt windings in series with each other and constitutes the only path for current during the reversing operation.

8. The method of reversing electric motors having shunt or compound wound field-magnets which consists in reversing the current in the armature-winding and at the same time maintaining a closed circuit which includes the shunt field-magnet and armature windings in series with each other and constitutes the only path for current during the reversing operation.

In testimony whereof I have hereunto subscribed my name this 29th day of December, A. D. 1896.

CHARLES S. COOK.

Witnesses:
H. A. CROOKS,
WALTER E. STEVENSON.